G. T. BUDDLE.
FISH LURE.
APPLICATION FILED JUNE 24, 1919.
1,333,154. Patented Mar. 9, 1920.
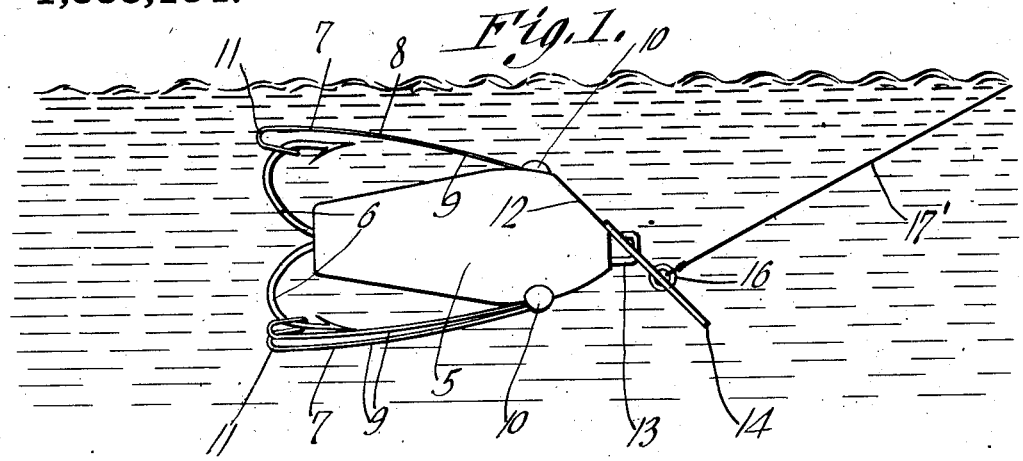
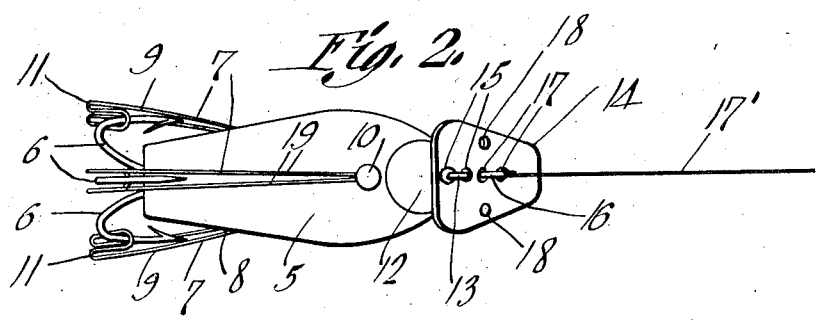
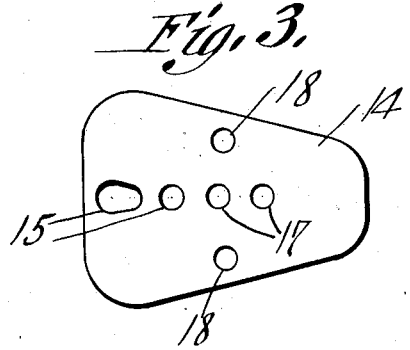
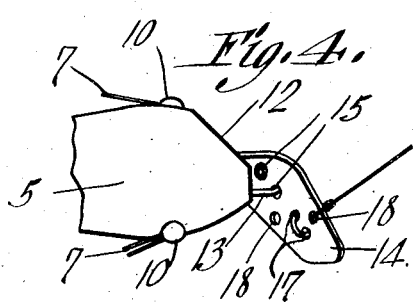
G. T. Buddle
Inventor
Witness
By C. A. Snow & Co.
Attorneys

UNITED STATES PATENT OFFICE.

GEORGE T. BUDDLE, OF CHICAGO, ILLINOIS.

FISH-LURE.

1,333,154.　　　　Specification of Letters Patent.　　Patented Mar. 9, 1920.

Application filed June 24, 1919. Serial No. 306,295.

*To all whom it may concern:*

Be it known that I, GEORGE T. BUDDLE, a citizen of the United States, residing at Chicago, in the county of Cook and State of Illinois, have invented a new and useful Fish-Lure, of which the following is a specification.

The present invention relates to fish lures or spoon devices, the primary object being to provide a fish lure which will possess the movements of a minnow or other small fish when pulled or drawn through or over the surface of the water.

A further object of the invention is to provide a fish lure which embodies a buoyant body having a rudder associated therewith that may be adjusted to cause the body to move and appear animated, the rudder being adjustable to cause the body to perform the various movements which are characterized by the different varieties of small fish that are commonly used for bait.

Still another object of the invention resides in the provision of a fish lure which embodies an angularly adjustable rudder to cause the body to rotate, travel in a sinuous plane upon the surface of the water, or to dive in the water.

Another object of the invention resides in the provision of a fish lure which includes an adjustable rudder which will free itself from weeds and the like should it become entangled in the same during the passage of the lure through the water.

It is another object of this invention to provide a fish lure which includes means for impaling the fish upon an attempt to devour the lure and effectively retain the fish from disengaging itself from the impaling hooks.

An additional object of the invention is to provide a fish lure which consists of few parts, which is inexpensive to manufacture and which may be sold at a minimum cost.

With the above and other objects and advantages in mind, the invention consists of combinations of elements, constructions and arrangements and formations and general assemblage and operations, all of which will be hereinafter referred to and recited in the subjoined claims.

Figure 1 is a side elevation of my lure in operative position in the water;

Fig. 2 is a plan view of the device showing the rudder in one position;

Fig. 3 is a plan view of the rudder detached; and

Fig. 4 is a fragmentary view of the device showing the rudder in position to cause the body to rotate.

Referring to the drawing, wherein like characters of reference designate like parts on all of the views, the numeral 5 designates a body formed of any desirable buoyant material such as wood and is shaped to resemble a minnow. Hooks 6 are secured to the tail of the body 5 and are disposed radially of the body.

A combined weed guard and fish holding device 7 is provided for each of the hooks 6 and each includes a length of resilient wire 8 bent to afford a pair of parallel legs 9 which extend longitudinally of the body and are attached to the same at the forward end thereof through the medium of fastenings 10. The intermediate part of each link is bent upon itself to afford a hook 11 which straddles one of the hooks 6, the legs 9 being disposed upon opposite sides of its respective hook thus should sea weed or the like be in the path of travel of the hooks, the sea weed will be deflected away from the hooks by striking the guards 7.

It will be seen that when a fish becomes impaled upon any of the hooks 6, one of the guards will grip that part of the fish engaged or impaled upon the hook, thus insuring the fish being landed.

The nose of the body 5 is provided with an inclined flat face indicated at 12. Mounted in the body 5 below the flat face is a forwardly projecting staple 13.

In order to cause the body 5 to appear animated and perform the various movements of a minnow or other small fish, a rudder 14 is provided which consists of a sheet metal plate of substantially triangular formation having a pair of alined openings 15 therein at the wide end which loosely receive the staple 13. A ring 16 is mounted in openings 17 below the point of attachment to the body 5 adapted to be secured to the fishing line indicated at 17'. Openings 18 are provided upon either side of the ring 16, either one of which may be attached to the fishing line. When the line is attached to the ring as indicated in Fig. 1 the wider end of the plate will lie against the flattened surface of the nose and cause the body 5 to bob up and down in the water and cause the same to travel in a sinuous path. Should the line be attached to one of the openings 18 the rudder will be tilted to dispose the same at an oblique angle with respect to the longitudinal axis of the body 5 and to cause the same to rotate in the water as it is drawn therethrough.

This embodiment of the invention is considered to be the preferred construction but it is to be understood that changes in the precise embodiment of the invention may be made within the scope of what is claimed without departing from the spirit of the invention.

What is claimed is:—

1. A fish lure comprising a body, a rudder loosely connected to the body, and said rudder being equipped with two series of alined openings, said series being arranged at right angles to one another whereby the rudder may be attached to the body and to a line.

2. A fishing lure comprising a body, a staple secured to one end of the body, a rudder having pairs of openings disposed therethrough, said staple adapted to embrace a portion of the rudder by its connection within the openings of one pair of openings to prevent lateral movement of the rudder with relation to the body after the rudder has been set, and means for securing a line to the body.

In testimony that I claim the foregoing as my own, I have hereto affixed my signature in the presence of two witnesses.

GEORGE T. BUDDLE.

Witnesses:
MERRILL FRIEDMAN,
ARTHUR COOTH.